United States Patent [19]

Hipp

[11] Patent Number: 5,757,501
[45] Date of Patent: May 26, 1998

[54] APPARATUS FOR OPTICALLY SENSING OBSTACLES IN FRONT OF VEHICLES

[76] Inventor: Johann Hipp, Schultessdamm 57, D-22391 Hamburg, Germany

[21] Appl. No.: 698,017

[22] Filed: Aug. 15, 1996

[30] Foreign Application Priority Data

Aug. 17, 1995 [DE] Germany .................. 195 30 281.8

[51] Int. Cl.[6] .................. G01B 11/24; G01C 3/08; G02B 26/08
[52] U.S. Cl. .................. 356/376; 356/4.01; 180/169; 359/205
[58] Field of Search .................. 356/376, 375, 356/397, 121, 4.01, 141.1; 180/169; 359/205, 208, 221

[56] References Cited

U.S. PATENT DOCUMENTS

| | | |
|---|---|---|
| 4,787,748 | 11/1988 | Rioux .................. 356/376 |
| 5,073,819 | 12/1991 | Gates et al. .................. 356/397 |
| 5,194,734 | 3/1993 | Whittaker et al. .................. 356/376 |
| 5,625,447 | 4/1997 | Kikuchi et al. .................. 356/4.01 |

*Primary Examiner*—Hoa Q. Pham
*Attorney, Agent, or Firm*—Samuels, Gauthier, Stevens & Reppert

[57] ABSTRACT

An apparatus for optically sensing obstacles in front of vehicles within a monitored sector, comprising a scanner disposed on the vehicle, which moves a narrowly focused beam of light pulses as well as the viewing direction of a light receiver in a rotation plane that is essentially horizontal, and an analyzing device which measures the profile of obstacles in the rotation plane from the angle and transit time of the pulses, is characterized in that the beam is moved in a 360° circle and in that at least one planar mirror is disposed next to the scanner, in the rotation plane, outside the monitored sector, so as to reflect the beam into the monitored sector.

5 Claims, 3 Drawing Sheets

APPARATUS FOR OPTICALLY SENSING OBSTACLES IN FRONT OF VEHICLES

BACKGROUND OF THE INVENTION

The invention relates to an apparatus to optically sense obstacles in front of vehicles.

Such apparatuses are described e.g. in a prospectus "LADAR 2D OWS" of IBEO LASERTECHNIK Company Fahrenkron 125, D-22163 Hamburg A prism rotated about a vertical axis deflects the beam generated by a pulse laser as well as the viewing direction of the receiver into a horizontal plane. If the beam encounters obstacles, their profile in the rotation plane can be determined exactly from the particular angular position and the pulse transit time difference. The measured profile can be displayed or measured to deliver warning signals or to provide automatic control of the vehicle by means of follow-on control computers.

In a known design, the beam traverses 360° in the rotation plane. However, a monitored sector in front of the vehicle with an angle of e.g. only 60° is needed. Consequently, only part of the possible angular resolution of the scanner is used. Thus, if e.g. the scanner can resolve 1° clearly, in a monitored sector of 60°, only 60 clearly distinguishable scans would result, although the scanner can resolve a total of 360 individual scans during a revolution. Furthermore, obstacles in the monitored sector are scanned at time intervals, since the beam must traverse a larger, unused angular sector, in the chosen example 300°, after traversing the monitored sector, until it returns again to the monitored sector.

Scanners of a different type are known, which swing the beam back and forth within the desired sector. These have the advantage of fully utilizing the possible resolution and of continuous scanning, but have the disadvantage, relative to continuously rotating devices, of discontinuous motion with permanent acceleration, which requires extreme design sophistication for adequate angular precision.

Scanners are also known which swing the beam spatially, for example by reflection successively from a mirror rotated about a horizontal axis and from one rotated about a vertical axis. The design sophistication required for this likewise is very great.

OBJECT OF THE INVENTION

It is an object of the present invention to create an apparatus of the type named in the introduction, which, while having a simple design, makes possible high angular resolution and more frequent scanning.

In this design, the beam is moved so as to rotate 360°. This is possible by a rotational drive with a very simple design and with very quiet running, so that the analytical device can measure the particular beam angle with extreme precision. Disturbances dues to acceleration are completely absent here. The 360° beam range of the scanner is used much better in this design than in the known designs. For one thing, the scanner radiates directly into the monitored sector. For another thing, it radiates into the monitored sector via the mirror. If several such mirrors are disposed about the scanner outside the monitored sector, the full 360° range of the scanner can be utilized, that is its full angular resolution. Dead times are avoided. One or more mirrors as stationary mounted parts increase the design complication only insignificantly. When the beam is reflected from a mirror, its radiation angle changes relative to its original radiation angle from the scanner, and its running direction in the monitored sector changes also. However, this can be taken into account by a simple change of the analytical algorithm in the analytical device, without additional design sophistication resulting from the use of suitable computer circuits. An apparatus with a very simple design results, which can continuously scan the monitored sector with high angular resolution.

The sector that is directly sensed by the scanner and the sectors in front of the vehicle that are sensed by one or more mirrors can be disposed variously within the monitored sector, e.g. next to one another. It is preferred that all of the sectors coincide. A sector corresponding to the monitored sector is then scanned several times during one rotation of the beam, and particularly once directly by the scanner and then again after reflection by the mirrors.

If the scanner and one or more mirrors radiate in different planes, inclined with respect to one another at an angle of elevation, obstacles at different heights can be sensed in the monitored sector. The sectors of the scanner and of the mirrors then coincide, and the entire monitored sector is scanned in several mutually inclined planes. Three-dimensional profiles can thus be created. In the case of vehicles, this development can also be advantageous if the vehicle is moving along a hilly road, so as to monitor the downhill road from a mountain top, or so as to be able to monitor the uphill road with the required range when situated before a hill. It should be noted that the three-dimensional scanner created in this way makes do without any moving parts for the altitudinal deflection of the beam.

Another advantage is that a mirror disposed behind the scanner in relation to the monitored sector has only a limited view forwards, since the scanner is situated in front of it. By designing the mirror as an angle mirror with an essentially parallel displacement of the beam, the reflected beam is reflected forward beyond the scanner, resulting in the full radiation sector of the mirror. In the case of the design, the angle if the angle mirror can be different from 90°, so that the mirror will reflect into a plane at an incline relative to the rotation plane of the scanner.

Another advantage is that a very simple and economical design is achieved in this way. The molded body can be designed, for example, as a plastic molded body, with the surfaces which form the specular surfaces being metallized to increase reflection. Such a design technically largely corresponds to commercial motor vehicle headlights, and can be manufactured economically in the same way, including a cover plate to protect against weather.

BRIEF DESCRIPTION OF THE DRAWINGS

The drawings show the invention by way of example and schematically.

FIG. 1 shows the schematic structure of a scanner 1 according to the prior art, which can be used for the present invention.

Figure 1:
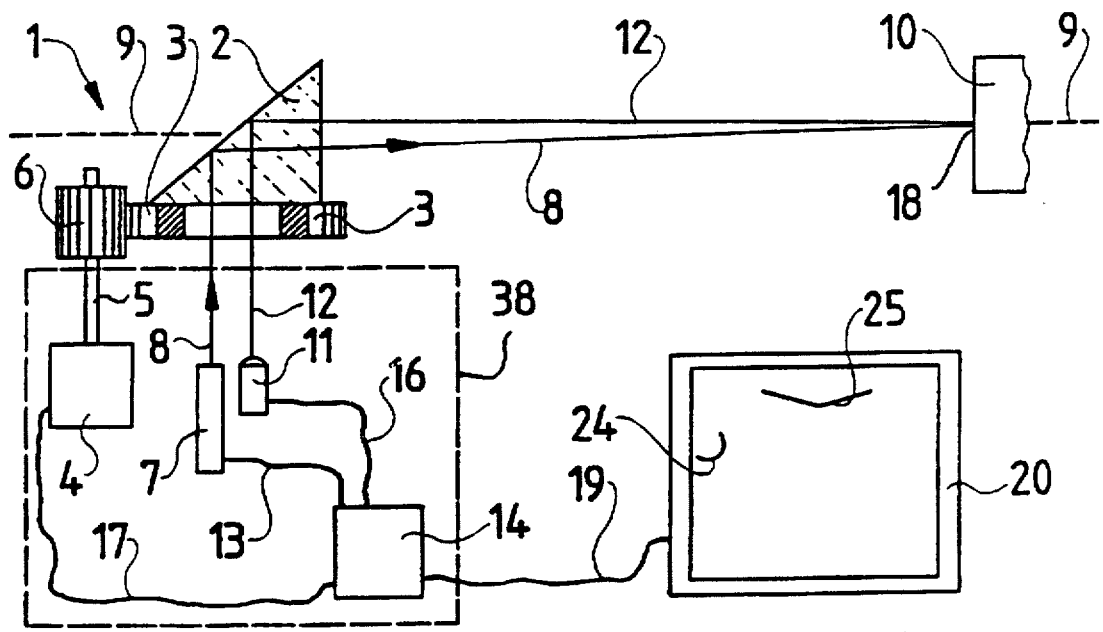
FIG. 1 shows a very schematic side view of a scanner.

A prism 2 shown in side view, has a toothed rim 3, which is rotatably mounted about a vertical axis by means which are not shown. A motor 4, for example a small electric motor, has a pinion 6 on a shaft 5, which is parallel to the rotation axis of the toothed rim 3. The pinion 6 engages the toothed rim 3 and drives the prism 2 so that it rotates.

A laser generator 7 radiates a laser beam 8 from below into the prism. After said laser beam is deflected in the prism 2, it exits in a rotation plane 9, which is essentially horizontal, and encounters an obstacle 10. A light receiver 11 with viewing direction 12 looks at the impact site of the beam 8, through the prism 2 along the same path.

The laser generator 7 is actuated via a line 13 from an analyzing device 14 with pulses to radiate laser pulses. From the light receiver 11 and via a line 16, the analyzing device 14 receives the light pulses reflected from the impact site at the obstacle 10. Via a line 17, and e.g. from the motor 4 or an angle coding device contained in it, the analyzing device determines the instantaneous angular position of the prism 2, that is the direction of the beam 8. From this angle and from the pulse transit time, it can calculate the exact location of the impact point 18 on the obstacle 10 in terms of distance and angle.

As shown here, the analyzing device 14 can, for example, actuate a monitor 20 via a line 19, so that the monitor displays the measured impact points 18.

Figure 2:
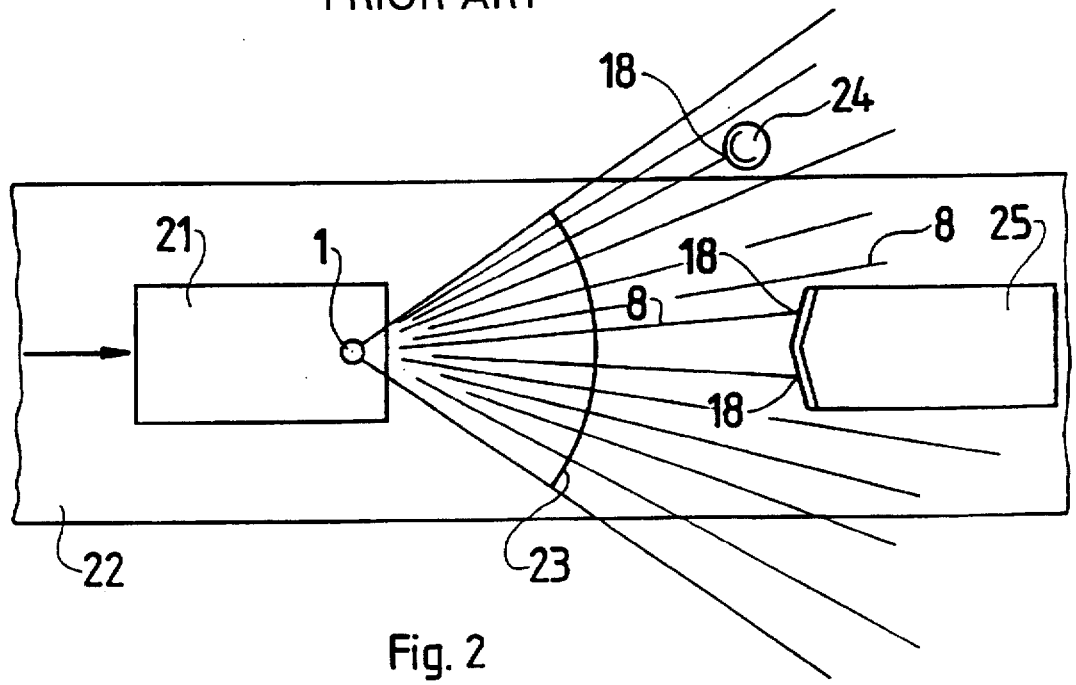
FIG. 2 shows a top view of a vehicle driving along a road, with the scanner of FIG. 1.

FIG. 2 shows a top view of the vehicle 21, which is moving on a road 22 in the direction of the arrow. The vehicle is equipped with the scanner 1. A monitored sector 23 in front of the vehicle 21 is supposed to be monitored for obstacles. At this time there is a tree 24 and oncoming vehicle 25 in the monitored sector 23. Wherever the beam 8 encounters the obstacles 24, 25, that is where there are impact points 18, the profile visible by the scanner 1 is measured. As regards the tree 24, what is involved is the semi-circumference around the scanner 1, and, as regards the oncoming vehicle, what is involved is the wedge-shaped bow section. The surfaces of the obstacles 24 and 25 which can be seen by the scanner 1 are marked in FIG. 2 with double lines. FIG. 1 shows how these lines can be displayed on the monitor 20.

The analyzing device 14 can also actuate a computer, not shown, which controls the vehicle. For example, it steers the vehicle past the tree 24 at a sufficient distance and, by appropriate dodging movements, prevents a collision with the oncoming vehicle 25.

The scanner 1 shown in FIG. 1 has only one rotating part, namely the prism 2 with its very simple drive. The prism 2 is rotated at a constant rpm without acceleration. The analyzing device 14 consequently can measure its current angular position with great precision, despite the simple design of the rotary drive. However, only the sector 23 shown in FIG. 2 is used from the beam which turns by 360° together with the scanner 1. Consequently, only the fraction corresponding to the sector 23 is used out of the maximum angular resolution of the scanner 1. Furthermore, the beam always requires a full turn until it passes again over the sector 23. Consequently, the scan also has time gaps.

A design as shown in FIGS. 1 and 2 corresponds to the prior art.

Figure 3:
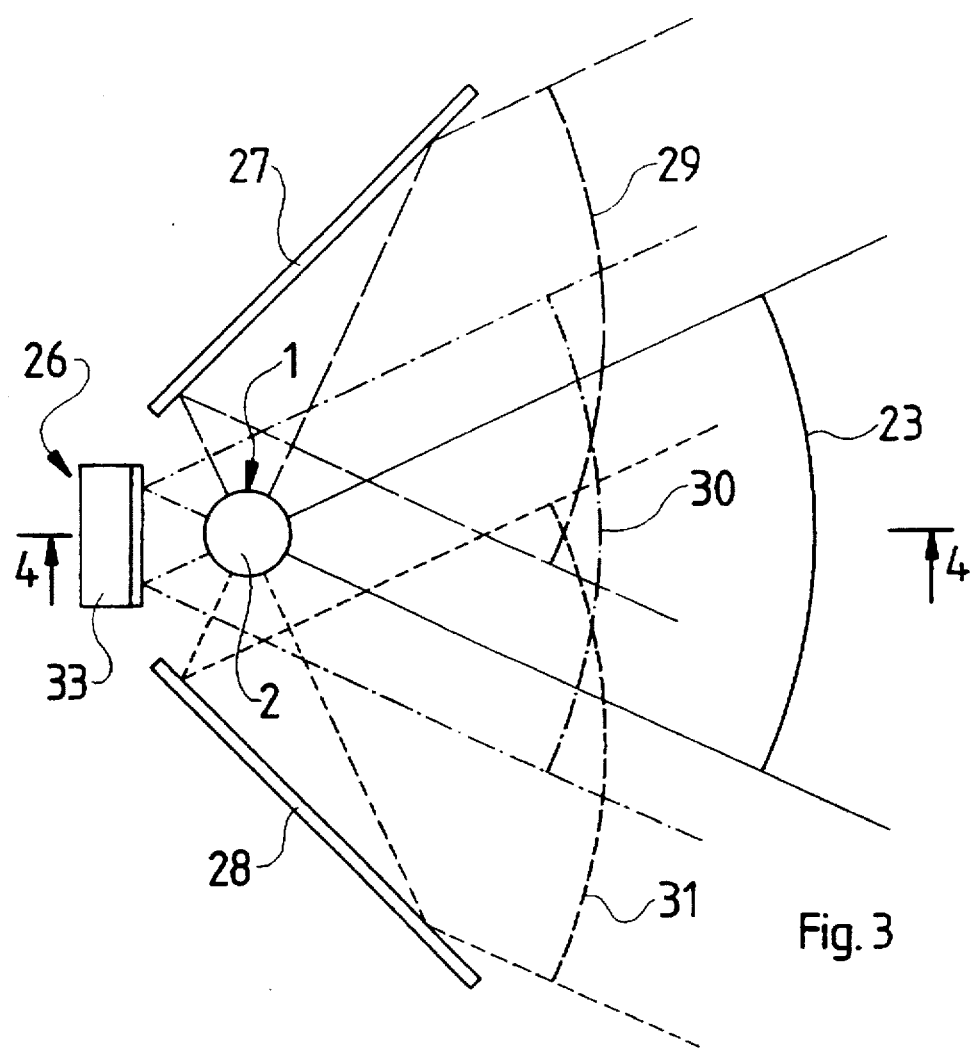
FIG. 3 shows a top view of the scanner schematically shown in FIG. 1, with three mirrors.
Figure 4:
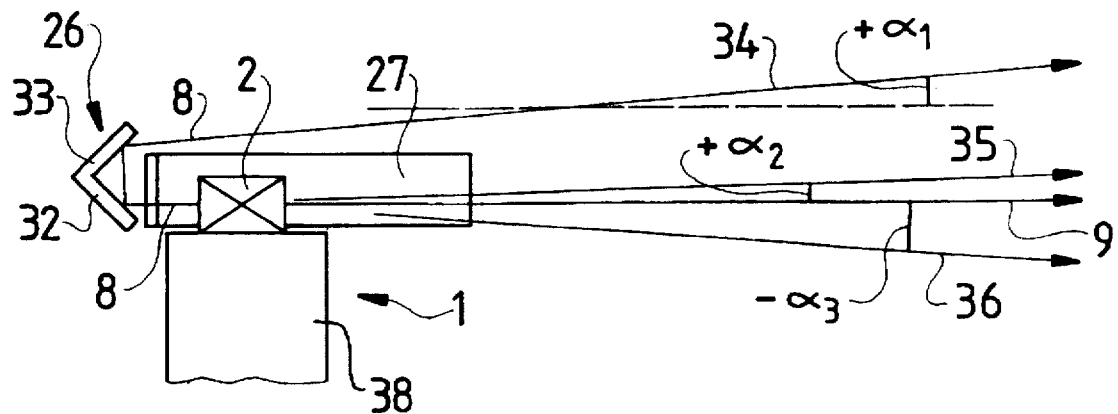
FIG. 4 shows a section along the line 4—4 of FIG. 3.

The invention specifies mirrors, as FIGS. 3 and 4 show schematically. FIG. 3 shows a top view of the scanner 1, that is a view in the direction of the rotation axis of the prism 2. The scanner is shown by its circumference, which results from the rotation of the prism 2. The limit angles of the monitored sector 23 are shown by solid lines. This monitored sector is scanned directly by the scanner 1. A central mirror 26 is permanently affixed on that side of the scanner 1 which faces away from the monitored sector 23. Two lateral mirrors 27 and 28 are permanently affixed laterally. The mirrors are aligned in such a way that they receive the radiation emitted at angles outside the monitored sector 23 and reflect it in the direction of the monitored sector 23.

In the example of FIG. 3 shown here, the lateral mirror 27 reflects into a sector 29, whose boundary beams are shown by long dashes. The central mirror 26 reflects into a sector 30, whose boundary beams are shown by dots and dashes. The lateral mirror 28 reflects into a sector 31, whose boundary beams are shown by short dashes.

In the embodiment shown here, 23, 29, 30 and 31 coincide in their direction and angle. The rotating beam generated by the scanner 1, for example if it rotates clockwise, first traverses the sector 23 directly, then successively the sectors 31, 30 and 29. At some distance from the scanner 1, these sectors overlap, so that the monitored sector 23, in front of the vehicle 21 as shown in FIG. 2, thus is scanned a total of four times in succession. This requires only permanently disposed, simple mirrors 26, 27 and 28.

The mirrors 26, 27 and 28 shown in FIG. 3 are disposed and aligned in such a way that they utilize the 360° radiation angle of the laser beam 8 in the rotation plane 9 as well as possible. More mirrors than the three shown in FIG. 3 can also be used for this. In simpler arrangements, a single mirror is already sufficient for doubling the resolution of the scanner 1. It should be noted that the mirrors 26, 27 and 28 must be planar mirrors, so as not to interfere with the focusing of the laser beam 8 and the focusing of the optics of the light receiver 11.

As FIG. 3 shows, the mirror 26, which is disposed directly behind the scanner 1, is blocked by the latter in its view forward into the monitored sector 23. It is therefore designed as an angle mirror, as shown in FIG. 4, with two component mirrors 32 and 33 fastened to one another. As the beam path shown in FIG. 4 indicates, the beam 8 emitted from the prism 2 is first reflected upward at the lower component mirror 32, and then is reflected forward by the upper component mirror 33 into the monitored sector 23. The beam is here displaced upward by an amount which is sufficient to send the beam out over the prism 2. As FIG. 3 shows, the lateral mirrors 27 and 28 make this design unnecessary, and can be designed as simple planar mirrors. The slight parallel displacement by a few centimeters between the beam deflected at a different height by the angular mirror 26 and the remaining beams is not troublesome in view of the distance of the obstacles 24 and 25, of e.g. 30m.

In the preferred arrangement shown in FIG. 3, the mirrors 26, 27 and 28 are aligned in such a way that their radiation sectors 29, 30 and 31 coincide with the sector 23, which is directly sensed by the scanner 1—at least at the rather large distance of the expected obstacles. However, the sectors also can be aligned next to one another, so that, for example, the monitored sector 23 of FIG. 2 is formed by a total of four adjoining sectors.

The mirrors 26, 27 and 28 can be aligned in such a way that they all reflect in the same plane, that is the rotation plane 9 of the scanner 1. At an obstacle, e.g. the obstacle 10 shown in FIG. 1, the beam 8 then always runs along the same elevation line, regardless whether it comes directly from the scanner 1 or after reflection from a mirror.

FIG. 4 shows a variant in which all the mirrors radiate in planes which are inclined with respect to the rotation plane 9 of the scanner 1. The scanner 1 radiates into the rotation plane 9. The central mirror 26 radiates into a plane 34, which is inclined upward by an angle $+\alpha_1$ relative to the rotation plane 9. The lateral mirror 27 radiates into a plane 35, which is inclined upward by an angle $+\alpha_2$ relative to the rotation plane 9. The lateral mirror 28 radiates into a plane 36, which is inclined downward by an angle $-\alpha_3$.

In this way, it is possible to scan the monitored sector 23 at various angles of elevation. Obstacles can thus be sensed in a three-dimensional profile. The mirrors required for this are permanent and stationary. Movable rotating devices are not necessary to change the elevation of the beam. The lateral mirrors 27 and 28 merely need to be mounted so that they tilt at an appropriate angle. The angular mirror 26 must have an angle between the mirrors 32 and 33 which is somewhat greater than 90°. In the case of FIG. 4, the angle must be 90+½ * $\alpha_1$..

Figure 7:
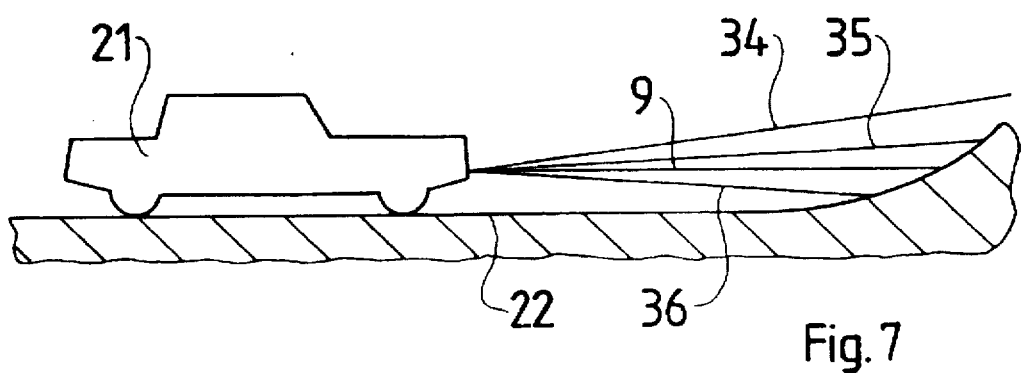
FIG. 7 shows a vehicle with the scanner of FIG. 4, on a road.

As FIG. 7 shows, planes radiated at different angles of elevation, can be used not only to create a three-dimensional profile of obstacles but also to adapt the monitoring to especially simple range finding.

FIG. 7 shows the vehicle 21 of FIG. 2, in front of which the radiation planes 9, 34, 35 and 36 of FIG. 4 have been drawn in. The vehicle 21 runs along the road 22, which rises in front of the vehicle. At the lowermost plane 36, the range is relatively short, at the uppermost plane 35, however, it is much further away, as the figure shows. If the road were to go downhill in front of the vehicle 21, the upper planes would be too high and, for example, would radiate above the oncoming vehicles. The lowermost plane 36 would then be especially valuable, since it could still sense obstacles.

Figure 5:
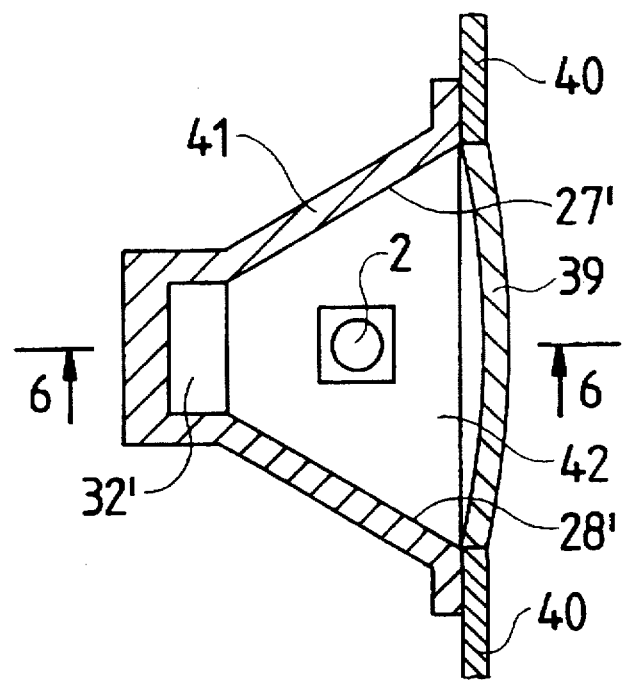
FIG. 5 shows a representation, in accordance with FIG. 3, of a complete apparatus with the molded bodies which form the mirrors.
Figure 6:
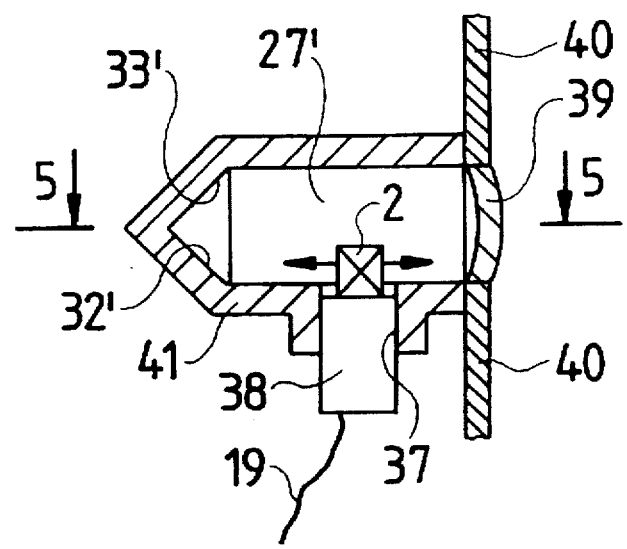
FIG. 6 shows a section along the line 6—6 in FIG. 5.

FIGS. 5 and 6 shows the specific structure of a sensing apparatus corresponding to the schematic representation of FIGS. 3 and 4. A molded body 41, made e.g. of plastic, has plane interior surfaces 27', 28', 32', and 33', which form the mirrors 26, 27 and 28 of FIGS. 3 and 4, as a comparison with these mirrors shows. Those surfaces of the molded body 41 which are used as mirrors are e.g. metallized, in order to increase reflectivity. This design is well established for motor vehicle headlights.

The bottom 42 of the chamber formed by the mirror surfaces contains a mount 37, designed as an opening, so as to accommodate a housing 38 with form-fit. As FIG. 1 (there by dashes) and FIG. 4 show, this housing encloses those parts of the scanner that are situated below the prism 2.

In this way, and using an economical technology, the molded body 41 forms a high-precision mount for all the mirrors and for the scanner 1.

FIGS. 5 and 6 furthermore show a transparent cover plate 39, which protects the chamber enclosed by the mirror surfaces against weather. The design shown in FIGS. 5 and 6 is aerodynamically recessed into the wall 40 of the body of a vehicle.

As FIGS. 5 and 6 show, the molded body 41 can be manufactured as a deep-drawn body made of a suitable plastic.

I claim:

1. An apparatus for optically sensing obstacles in front of vehicles within a monitored sector, comprising;

a scanner attached to said vehicle, said scanner moving a narrowly focused beam of light pulses and the viewing direction of a light receiver in an essentially horizontal rotation plane; and an analyzing device which measures the profile of obstacles in said rotation plane from an angle and transit time of said pulses, wherein said beam is moved in a 360° circle, and wherein at least one planar mirror is disposed next to said scanner in said rotation plane, outside said monitored sector, so as to reflect said beam into said monitored sector.

2. The apparatus of claim 1, wherein a sector, scanned by said beam after reflection from said mirror coincides with said monitored sector, which is scanned directly by the scanner.

3. The apparatus of claim 1, wherein said mirror reflects said beam into a plane, which is inclined by an angle of elevation relative to said rotation plane of said scanner.

4. The apparatus of claim 1, wherein a mirror disposed behind said scanner relative to said monitored sector elevates said beam, and is a parallel reflecting angle mirror.

5. The apparatus of claim 1, wherein said mirror and a mount for holding said scanner are surfaces of a molded body.

* * * * *